US010512208B2

United States Patent
Gebbeken et al.

(10) Patent No.: US 10,512,208 B2
(45) Date of Patent: Dec. 24, 2019

(54) AGRICULTURAL SEED DRILL

(71) Applicant: Lemken GMBH & Co KG, Alpen (DE)

(72) Inventors: Martin Gebbeken, Alpen (DE); Dennis Bergerfurth, Rees (DE); Mark Berendsen, Lengel (NL); Marcel Geraats, Nettetal (DE); Christian Gotzen, Viersen (DE); Thomas Lukas, Ahaus-Wullen (DE); Christian Paessens, Issum (DE); Dieter Werries, Alpen (DE); Andreas Van Kann, Dahlem (DE); Jorg Dupmann, Hamminkeln (DE)

(73) Assignee: Lemken GMBH & Co KG (DE)

( * ) Notice: Subject to any disclaimer, the term of this patent is extended or adjusted under 35 U.S.C. 154(b) by 0 days.

(21) Appl. No.: 15/565,836

(22) PCT Filed: Apr. 15, 2016

(86) PCT No.: PCT/DE2016/100180
§ 371 (c)(1),
(2) Date: Oct. 11, 2017

(87) PCT Pub. No.: WO2016/165697
PCT Pub. Date: Oct. 20, 2016

(65) Prior Publication Data
US 2018/0110181 A1 Apr. 26, 2018

(30) Foreign Application Priority Data
Apr. 15, 2015 (DE) .......................... 10 2015 105 790

(51) Int. Cl.
*A01C 7/10* (2006.01)
*A01C 7/08* (2006.01)
(Continued)

(52) U.S. Cl.
CPC .............. *A01C 7/105* (2013.01); *A01C 7/046* (2013.01); *A01C 7/081* (2013.01); *A01C 7/082* (2013.01);
(Continued)

(58) Field of Classification Search
CPC ........... A01C 7/105; A01C 7/081; A01C 7/04; A01C 7/042; A01C 7/044; A01C 7/046; A01C 7/123; A01C 7/082
See application file for complete search history.

(56) References Cited

U.S. PATENT DOCUMENTS 4,238,790 A * 12/1980 Balogh .................. A01C 7/105
111/903
5,936,234 A 8/1999 Thomas et al.
(Continued)

FOREIGN PATENT DOCUMENTS

| CA | 2824618 A1 | 7/2012 |
| DE | 3419883 A1 | 11/1985 |

(Continued)

OTHER PUBLICATIONS

Späte Überraschungen Ausgeschlossen "in the periodical" profi Jan. 2015, published by Landwirtschaftsverlag Münster.

*Primary Examiner* — Alicia Torres
(74) *Attorney, Agent, or Firm* — The Watson IP Group, PLC; Jovan N. Javanovic

(57) ABSTRACT

An agricultural seed drill with a seed sensor, generally of the type having a plurality of row units comprising a separation device. The separation device is provided with two or more separate outlet openings for separated seeds, and wherein each outlet opening is associated with a guide channel and a furrow opener, for depositing seed into a ground furrow. Further, a detector is arranged between the outlet opening and the furrow opener, to detect the discharge of a separated (Continued)

seed element through the outlet opening into the furrow opener and to convert it into a signal.

8 Claims, 4 Drawing Sheets

(51) Int. Cl.
  *A01C 7/04*   (2006.01)
  *A01C 7/20*   (2006.01)
  *G01V 8/20*   (2006.01)
  *A01C 5/06*   (2006.01)

(52) U.S. Cl.
  CPC ................ *A01C 7/206* (2013.01); *G01V 8/20* (2013.01); *A01C 5/064* (2013.01); *A01C 7/08* (2013.01)

(56) References Cited

U.S. PATENT DOCUMENTS

| | | | |
|---|---|---|---|
| 7,472,660 B2 | 1/2009 | Mariman et al. | |
| 7,478,603 B2 | 1/2009 | Riewerts et al. | |
| 8,504,310 B2 * | 8/2013 | Landphair | A01C 7/081 |
| | | | 702/45 |
| 9,888,622 B2 * | 2/2018 | Henry | A01C 7/084 |
| 2012/0227647 A1 * | 9/2012 | Gelinske | G01F 1/666 |
| | | | 111/174 |
| 2014/0358381 A1 | 12/2014 | Holland | |

FOREIGN PATENT DOCUMENTS

| | | |
|---|---|---|
| DE | 102007031576 A1 | 1/2009 |
| EP | 2044828 A2 | 4/2009 |
| EP | 2227932 A1 | 9/2010 |
| WO | 2011113159 A1 | 9/2011 |

* cited by examiner

AGRICULTURAL SEED DRILL

BACKGROUND

The invention relates to an agricultural seed drill with a seed sensor, generally of the type having a plurality of row units comprising a separation device. The separation device is provided with two or more separate outlet openings for separated seeds, and wherein each outlet opening is associated with a guide channel and a furrow opener, for depositing seed into a ground furrow. Further, a detector is arranged between the outlet opening and the furrow opener, to detect the discharge of a separated seed element through the outlet opening into the furrow opener and to convert it into a signal.

Agricultural spreading machines for spreading granular material are often provided with flow or particle sensors to count the number of grains discharged, or to detect blockages in the discharge conduit system. Accordingly, suitable sensors are assigned to the individual lines, wherein the sensors themselves have evaluation units which are connected to a display or data acquisition unit via a cable harness.

An overview of the functioning of such monitoring systems may be found in the article "Späte Überraschungen Ausgeschlossen" in the periodical "profi Jan. 2015, published by Landwirtschaftsverlag Münster." The structure and function, for example of an optical matrix counter, is explained in the German patent application DE3419883A1.

The object of the invention is to adapt such flow or particle sensors in a cost-effective manner to a seed drill which, with a separation unit, serves several seed rows. Accordingly, the cabling requirement is reduced and operational reliability increased.

SUMMARY OF THE DISCLOSURE

This object is achieved by the at least two outlet openings which are assigned to a common signal evaluation unit, while the signal evaluation unit is accommodated in a housing together with the detectors. Since a plurality of outlet openings are inevitably spaced apart from one another, fixing of the detectors to the individual outlet openings, in particular though an anti-rotation device, is achieved by arranging several detectors in a common housing. Since the signal evaluation unit may be produced cost-effectively with a plurality of signal inputs, the signal evaluation unit, including the required signal connection lines to the detectors, is accommodated and protected in the housing. In the same way, a signal input of the evaluation unit may interrogate several detectors one after the other via a multiplexing process. Only a single communication and/or power supply line is required per housing and separation unit.

By integrating the detectors and the evaluation unit on a common circuit board, for example a printed circuit board (PCB) arrangement, an extremely cost-effective production method is achieved with the detector arrangement being simultaneously defined. By potting the circuit within the housing, for example with an insulating resin, maximum operational reliability is achieved.

If the detectors are designed, for example, in the form of a ring or as a gate, the seed flow may pass through an undivided circuit board provided with openings or breakthroughs.

By arranging the openings of the circuit board at the central distance between the seed outlets and/or the furrow openers, direct seed guidance from the separation device into the furrow opener is achieved, which largely avoids collisions of the seed grains with boundaries, and ensures the highest detection accuracy.

The invention has proven itself in practice in a practical test on a row unit with a plurality of furrow openers, on which is constructed a common separation device per row unit.

By communication of the evaluation units with a common process control computer of the seed drill, the output parameters of each row unit may be monitored and/or regulated. Communication may be effected wirelessly or via a data bus. In the bus solution, both the drive control of, for example, electrical separation drives per row unit, as well as the communication and power supply, may be effected jointly and in a sequence-specific manner via a common cable harness. If the detector housing is provided with couplings, the housing, the lines or the separation unit may be completely or partially opened or (dis)assembled.

If the coupling surfaces are provided with an additional holding device, which is mounted, for example, as a pivotable clip or lever on the detector housing, the detector housing itself forms a coupling interface between the separation unit and the furrow opener. The conical shape of the coupling surfaces is at least partly surrounded by the holding element and seals the coupling elements axially and with little turbulence, which is beneficial for measurement and detection accuracy.

The invention is distinguished, in particular, by the fact that the flow and particle sensors, so-called detectors, of a plurality of distribution lines are accommodated in a common housing in a fixed and protected manner, together with a signal evaluation unit, at low cost.

BRIEF DESCRIPTION OF THE DRAWINGS

Further details and advantages of the subject matter of the invention may be gathered from the following description and the associated drawings which show an exemplary embodiment with the necessary details and parts.

DETAILED DESCRIPTION OF THE DRAWINGS

Figure 1:
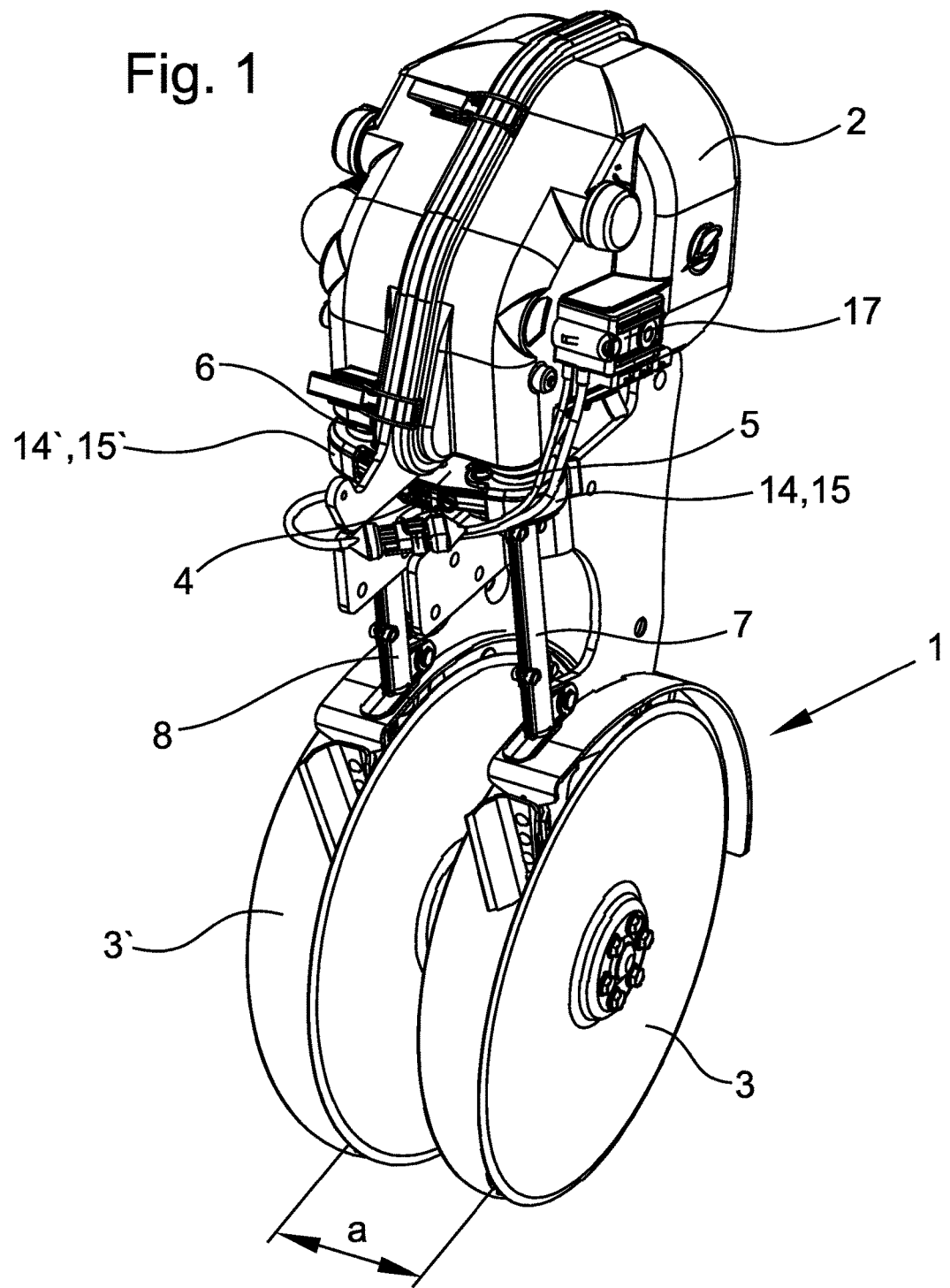
FIG. 1 shows the schematic structure of individual components of a row unit of a seed drill.

Missing reference characters in the figures, the components of which have been omitted for the sake of clarity, may be found in the other figures.

FIG. 1 shows the basic structure of the proposed invention, comprising a row unit 1, which is arranged several times side by side and is vertically movable on a carrier frame of the seed drill. From a separation unit 2, which is externally filled with seed and is subjected to an overpressure or vacuum, individual seed grains pass from the separation unit 2 alternately from the outlets 5 and 6 under the influence of a fan air flow through the common housing 4, which has passage openings, into the guide channels 7, 8 below and which open into the furrow openers 3, 3'. These are arranged as rotating double disc coulters at a distance an adjacent to one another and intersect two adjacent seed furrows at a distance a in the ground into which the seed grains are deposited alternately on the right and on the left at the same longitudinal distance. The spacing a is approximately 125 to 150 mm, while the mean spacing of the row units relative to one another is approximately 750 mm, which corresponds to the customary arrangement of a single-grain seed drill, for example for sowing maize. Other rows and furrows are chosen according to the type of cultivation. The separation device is controlled and regulated as a function of the driving speed or distance traveled by a process control computer (not shown), together with an electrical power supply and a drive unit 17, in this case a CAN bus-controlled electric motor. The housing 4 with the outlets 5, 6 of the separation device 2 and the guide channels 7, 8 is integrated into the seed guide by means of couplings 14, 14' and associated holding elements.

Figure 2:
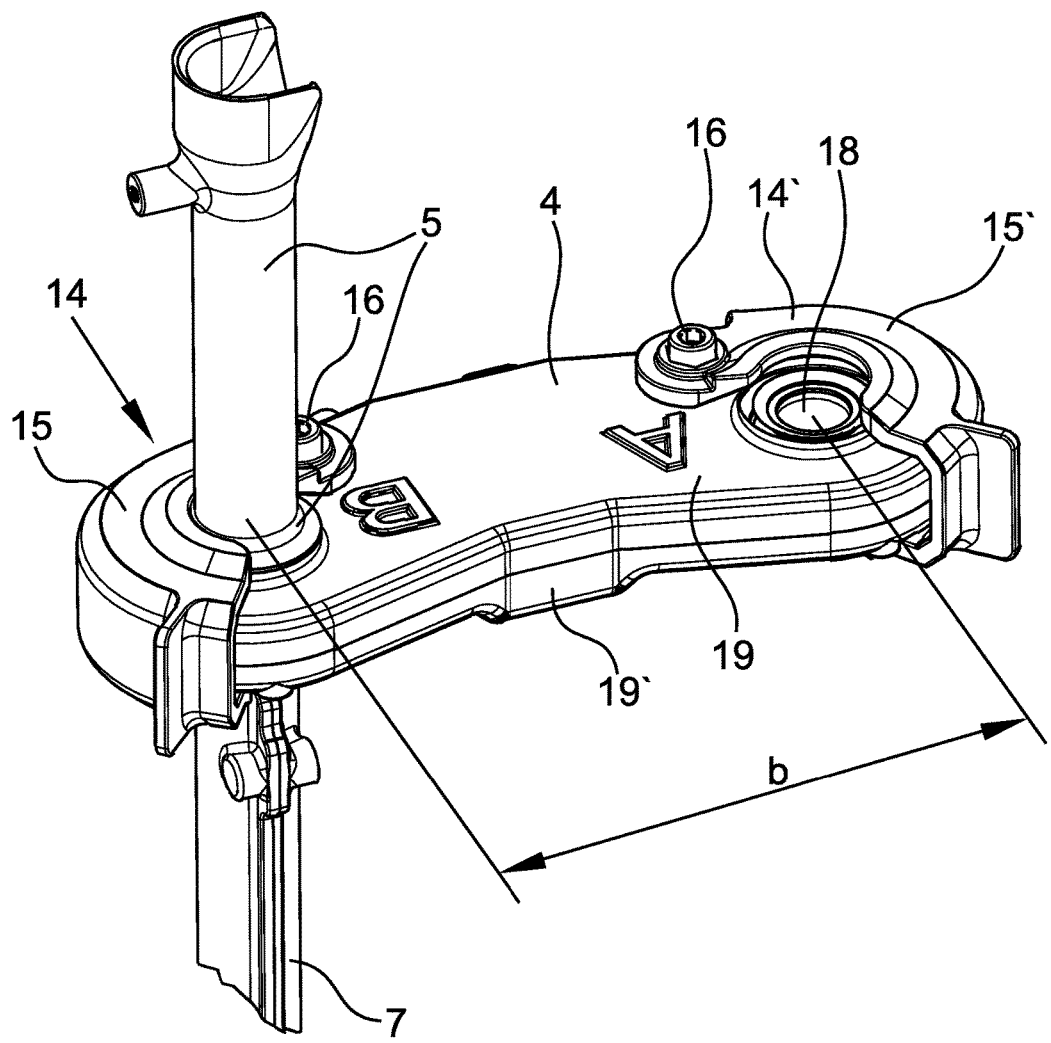
FIG. 2 shows a housing, which contains the signal evaluation unit and the detectors.

FIG. 2 shows the housing 4 which includes the (unshown) circuit board 12 and the detectors 9, 10 arranged thereon, as well as the signal evaluation unit 11. The housing 4 consists of upper and lower housing halves 19, 19', which are respectively clipped, glued or screwed together. The circuit board 12 is sandwiched between them. The housing has two continuous measuring channels 18 at a distance b from which the channel 18 is concealed on the B side by the outlet opening 5, which is taken up by the separation device 2. The distance b corresponds to the distance a from FIG. 1.

On the lower side, the guide channel 7 is connected in the direction of the furrow opener. For the sake of clarity, the A-side is shown without the outlet opening 6 and the guide channel 8. The couplings 14, 14' and their holding elements 15, 15', which may be seen clearly in the drawing, are the outlet openings 5, 6 and the guide channel 7, 8 which fix a possible pivotal movement about the pivot axis 16 relative to the housing 4 or to the measuring channel 18 which passes through the housing 4. The pivot axis 16 is formed by a bolt or screw with a nut. The measuring channel 18 consists of a material which is at least partially light-transmissive and extends approximately over the height of the housing 4 and through the printed circuit board 12.

Figure 3:
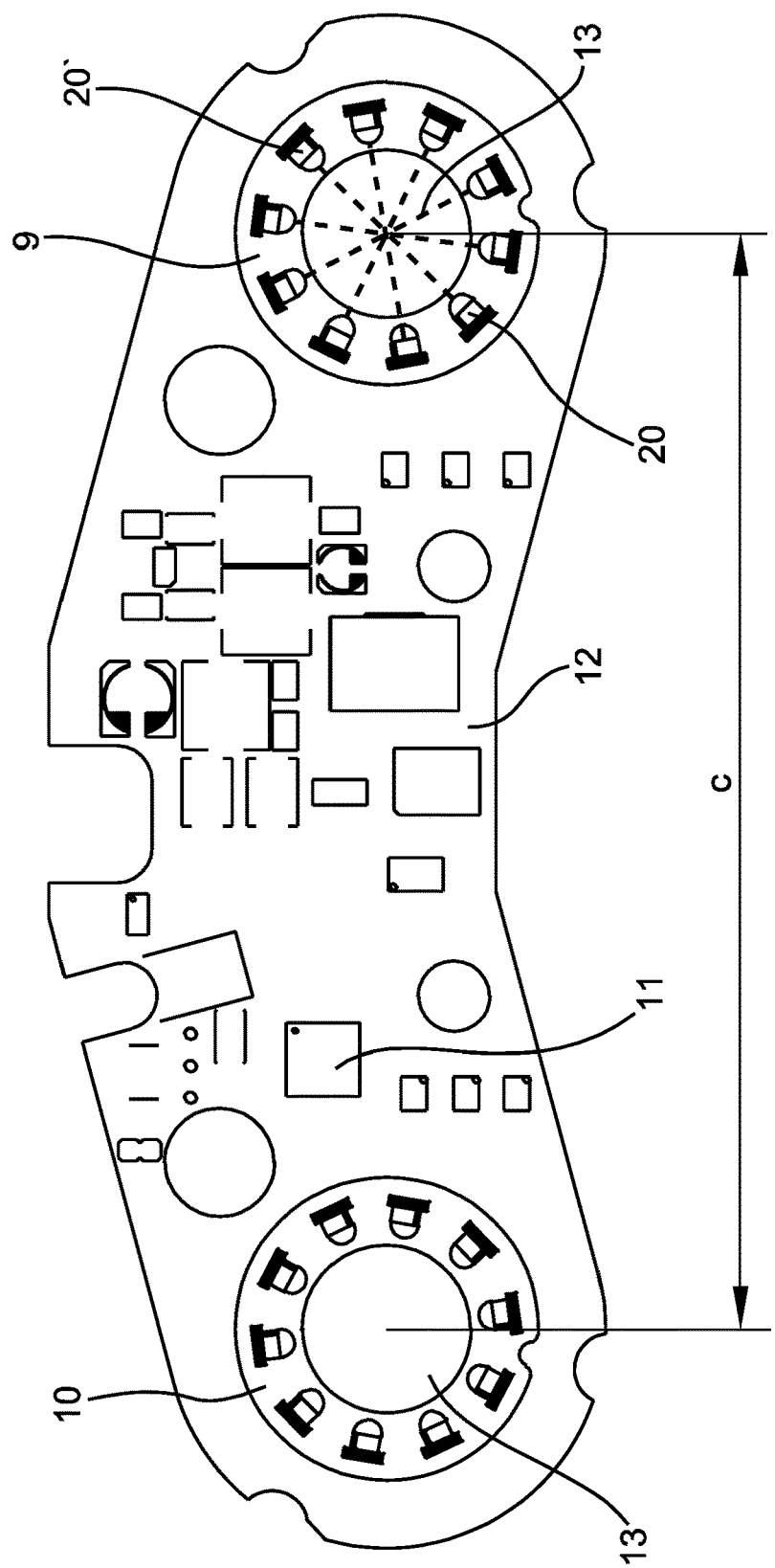
FIG. 3 shows an arrangement of two detectors and a signal evaluation unit on a common printed circuit board.

FIG. 3 shows the top view of the printed circuit board 12 which, in addition to various electronic components, carries the two detectors 9, 10 and the signal evaluation unit 11. The two detectors 9, 10 are fastened concentrically around the two openings 13, 13' of the printed circuit board 12, and which are arranged at a distance c, and respectively consist of 10 optical transmitter and receiver units 20, 20', which are respectively arranged opposite and concentric to the breakthroughs 13, 13' in a star-shaped manner. In each case, two opposite transmitting and receiving units 20, 20' mutually illuminate one another to form an optical stargate with the other transmitting and receiving units, and through which the seed grains separated by the separation device pass through at high speed and interrupt the gate beams. This reliably detects the passage of the seed grains. The transmitter and receiver units 20, 20' signal the passage of the grain in the form of an electrical signal to the signal evaluation unit 11 via conductor tracks of the printed circuit board 12 and, optionally, intermediate amplifier elements or trigger elements. The transmitter and receiver units 20, 20' are protected against contamination, for example by dust from the seed, in the light-transmissive measuring channel 18 from FIG. 2. If the detection quality is reduced as a result of contamination of the measuring channel 18, the optical transmission power or the sensitivity of the transmitter and receiver units 20, 20' may be automatically adjusted and regulated by the signal evaluation unit 11 until reliable detection is re-established. The communication of the signal evaluation unit 11 and the addressing by the process control computer of the single-grain seed drill is effected, for example, by means of a CAN bus which passes with a plug connection from the housing into a cable tree of the seed drill.

The power supply to the printed circuit board 12 and its components is preferably effected via the same cable harness, as is the drive control of the separation devices, as well as possible level position and pressure sensors. The housing and the printed circuit board are sealed by an insulating resin or similar material and thus protected against external influences.

Figure 4:
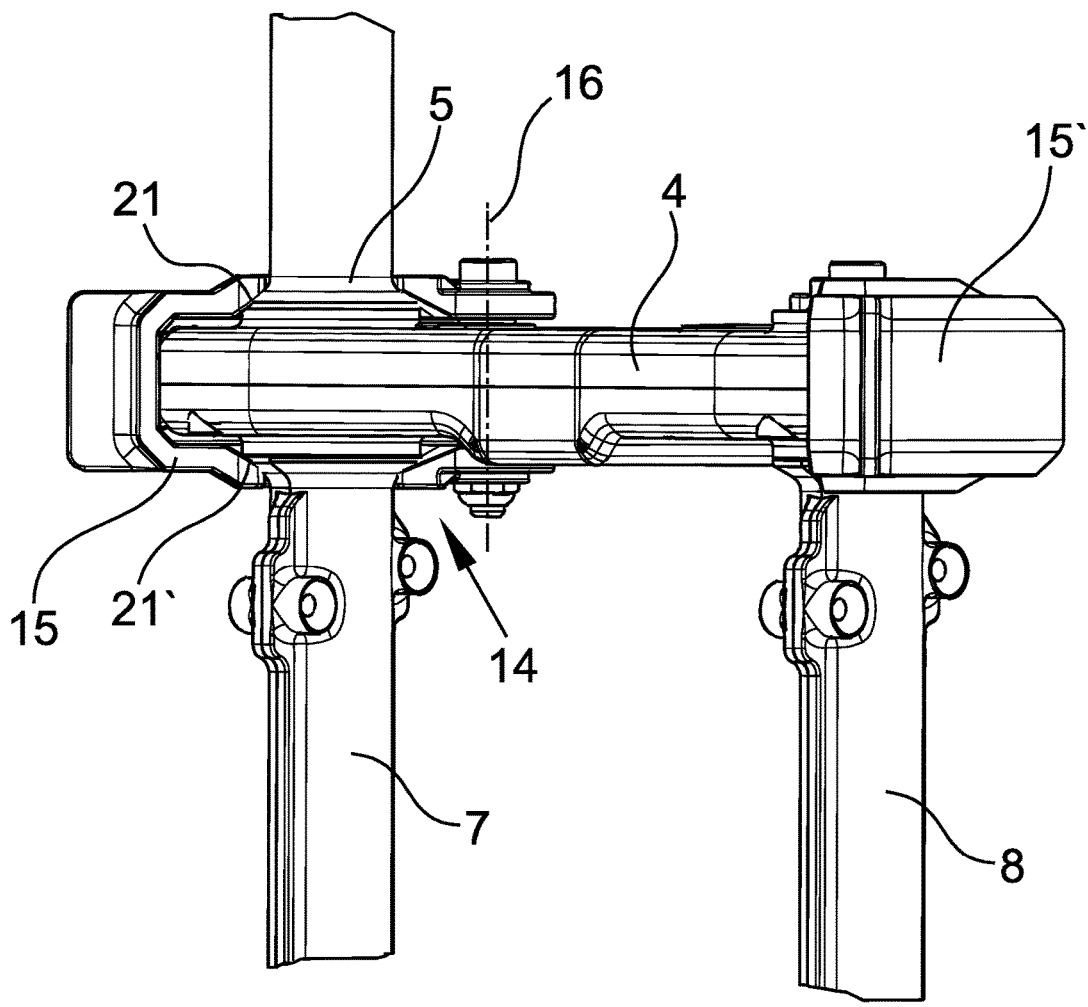
FIG. 4 shows the structure of a coupling device between the outlet opening, the housing and the guide channel.

Analogously to FIG. 2, the fastening diagram of the coupling 14 with the seed outlet 5, the guide channel 7 and the housing 4, is shown again in FIG. 4. The seed outlet 5 and the guide channel 7 have a conically-shaped, peripherally-flanged edge, the oblique surfaces 21, 21' of which are partially enclosed by the holding element 15 and which secure the components, in particular, against axial movement. If the holding elements 15, 15' are pivoted back about the pivot axes 16, the housing may be easily pulled out between the seed outlet 5, 6 and the guide channels 7, 8.

This is particularly useful for cleaning the measuring channels 18 in the case of extreme contamination. However, practice has shown that, in the case of smooth inner surfaces of the channels and their transitions, there are hardly any flow turbulences, while regular cleaning is not necessary. Nevertheless, good and fast accessibility to all components is possible. The holding elements 15 are secured against unintentional release by means of a housing-side latching point. Further securing or fastening elements are likewise conceivable.

LIST OF REFERENCE NUMERALS

1 Row unit
2 Separation device
3 Furrow opener
4 Housing
5 Outlet opening
6 Outlet opening
7 Lead channel
8 Lead channel
9 Detector
10 Detector
11 Signal evaluation unit
12 Circuit board, PCB arrangement
13 Opening, breakthrough
14 Coupling
15 Holding element
16 Pivot axis
17 Drive unit
18 Measuring channel
19 Housing half
20 Transmitter and receiver unit
21 Conical taper

The invention claimed is:
1. Single-seed agricultural seed drill comprising:
a plurality of row units comprising a separation device, wherein the separation device is provided with two or more separate outlet openings for separated seeds, and wherein each outlet opening is associated with a guide channel and a furrow opener, for depositing seed into a ground furrow, wherein a detector is arranged between the outlet opening and the furrow opener, to detect the discharge of a separated seed element through the outlet opening into the furrow opener and to convert it into a signal, and wherein the at least two outlet openings are assigned to a common signal evaluation unit, while the common signal evaluation unit is assigned to the detectors and is accommodated in a housing together with the detectors, and wherein the detectors and the signal evaluation unit are arranged as electronic components on a single printed circuit board.

2. A single-seed agricultural seed drill compromising:

a separation device, wherein the separation device is provided with at least two outlet openings for a separated seeds, and wherein each outlet opening is associated with a guide channel and a furrow opener, for depositing seed into a ground furrow, wherein detectors are arranged between the outlet opening and the furrow opener, to detect discharge of a separated seed element through the outlet opening into the furrow opener and to convert it into a signal, and a printed circuit board having an opening or breakthrough for each detector, wherein the at least two outlet openings are assigned to a common signal evaluation unit, while the common signal evaluation unit is assigned to the detectors and is accommodated in a housing together with the detectors.

3. A single-seed agricultural seed drill compromising:

a separation device, wherein the separation device is provided with at least two outlet openings for separated seeds, and wherein each outlet opening is associated with a guide channel and a furrow opener, for depositing seed into a ground furrow, wherein detectors are arranged between the outlet opening and the furrow opener, to detect discharge of a separated seed element through the outlet opening into the furrow opener and to convert it into a signal, and a central spacing of the opening or breakthrough that corresponds to a central spacing between at least one of the seed outlets of the separation device and the central spacing of the furrow opener, wherein the at least two outlet openings are assigned to a common signal evaluation unit, while the common signal evaluation unit is assigned to the detectors and is accommodated in a housing together with the detectors.

4. The agricultural seed drill according to claim 1, wherein the furrow opener is associated with a single separation device and a single housing of a row unit of the agricultural seed drill.

5. The agricultural seed drill according to claim 1, wherein the agricultural seed drill is associated with a process control computer for the indication or regulation of process parameters of the seed drill, wherein the process control computer as well as the signal evaluation units each have a data transmission device.

6. A single-seed agricultural seed drill compromising:

a separation device, wherein the separation device is provided with at least two outlet openings for separated seeds, and wherein each outlet opening is associated with a guide channel and a furrow opener, for depositing seed into a ground furrow, wherein detectors are arranged between the outlet opening and the furrow opener, to detect discharge of a separated seed element through the outlet opening into the furrow opener and to convert it into a signal, and wherein the at least two outlet openings are assigned to a common signal evaluation unit, while the common signal evaluation unit is assigned to the detectors and is accommodated in a housing together with the detectors; and wherein the housing with the detectors and the evaluation unit compromises coupling devices, via which the housing is connected to at least one of the seed outlets openings and the guide channels.

7. A single-seed agricultural seed drill compromising:

a separation device, wherein the separation device is provided with at least two outlet openings for a separated seeds, and wherein each outlet opening is associated with a guide channel and a furrow opener, for depositing seed into a ground furrow, wherein detectors are arranged between the outlet opening and the furrow opener, to detect discharge of a separated seed element through the outlet opening into the furrow opener and to convert it into a signal, and a coupling provided with a pivotable or clipable holding device, which encloses at least one of the seed outlets, the guide channels and the housing at connection ends thereof at in at least one of a partial form and force fitting manner, wherein the at least two outlet openings are assigned to a common signal evaluation unit, while the common signal evaluation unit is assigned to the detectors and is accommodated in a housing together with the detectors.

8. A single-seed agricultural seed drill compromising:

a separation device, wherein the separation device is provided with at least two outlet openings for separated seeds, and wherein each outlet opening is associated with a guide channel and a furrow opener, for depositing seed into a ground furrow, wherein detectors are arranged between the outlet opening and the furrow opener, to detect discharge of a separated seed element through the outlet opening into the furrow opener and to convert it into a signal, wherein the at least two outlet openings are assigned to a common signal evaluation unit, while the common signal evaluation unit is assigned to the detectors and is accommodated in a housing together with the detectors, and wherein at least one of the seed outlets, the guide channels and the housing are provided with conically-inclined surfaces at their connection ends, wherein a holding element corresponding in its shape to the conical surfaces at least partially grips the conical surfaces, and exerts an axial holding or sealing force on at least one of the seed outlets, the guide channels and the housing through the conical bevels.

* * * * *